Figure 5:
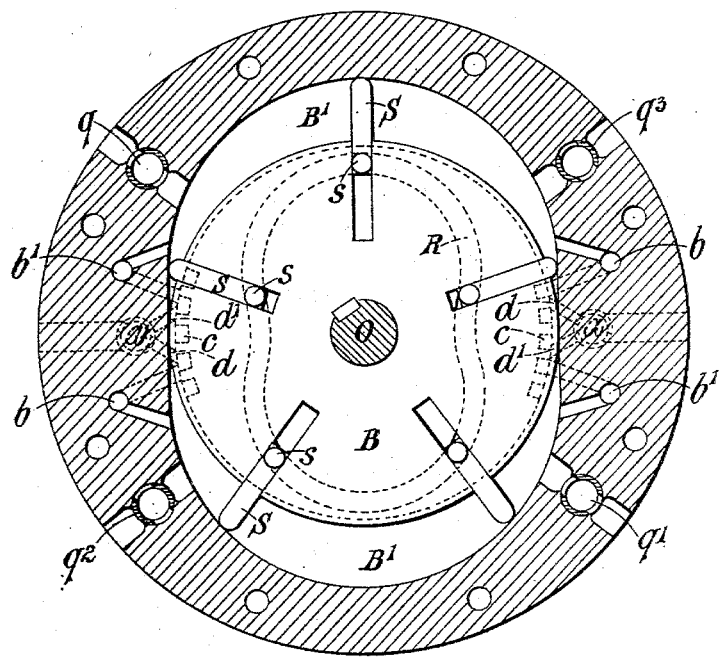

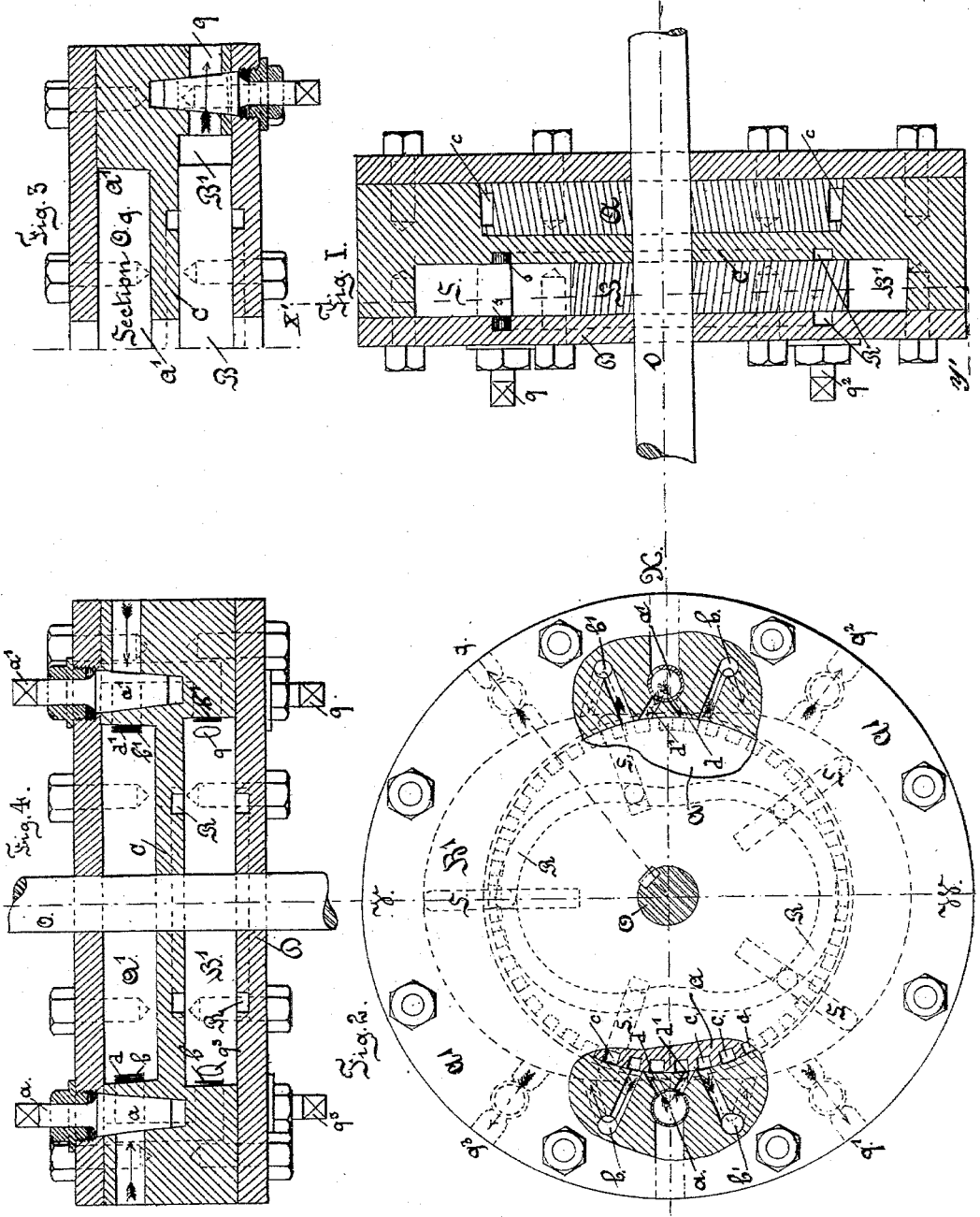

(No Model.) 2 Sheets—Sheet 2.

A. F. S. VAN DE LAAR.
ROTARY ENGINE.

No. 571,727. Patented Nov. 17, 1896.

Witnesses.
Vinton Coombe.
Robert Everett.

Inventor:
Andries F. S. Van de Laar.
By James L. Norris.
Atty

UNITED STATES PATENT OFFICE.

ANDRIES FREDERIK SINCLAR VAN DE LAAR, OF AMSTERDAM, NETHERLANDS.

ROTARY ENGINE.

SPECIFICATION forming part of Letters Patent No. 571,727, dated November 17, 1896.

Application filed October 12, 1894. Serial No. 525,701. (No model.)

*To all whom it may concern:*

Be it known that I, ANDRIES FREDERIK SINCLAR VAN DE LAAR, technologist, a subject of the Queen of the Netherlands, residing at Amsterdam, Netherlands, (Holland,) have invented certain new and useful Improvements in Rotary Engines, of which the following is a specification.

My invention relates to a rotary multiple-expansion fluid-pressure engine wherein wheels or disks secured to a single shaft mounted in a cylindrical casing are set in rotary motion by the steam or other fluid issuing from diametrically opposite passages arranged against the periphery of one or more of the said wheels or disks. The live steam or other fluid from the boiler or the like is first directed against the periphery of a toothed wheel or disk and by reason of its velocity or dynamic force rotates the said wheel or disk. When this wheel or disk has been thus moved through a certain distance, the not-yet-expanded steam or other fluid, carried in the spaces between the teeth of the said wheel or disk, flows through a passage formed in the cylindrical casing into a second but elliptically-formed chamber, which is arranged near to the cylindrical casing and is separated by fluid-tight partitions therefrom and from others of a series of such chambers. In this chamber is a second wheel or disk mounted on the motor-shaft and provided with five or any other suitable number of radially-arranged slides or pistons. These slides or pistons are movable in a radial direction, so that their outer edges always fit closely or accurately against the inside of the elliptically-formed expansion-chamber. The expanding steam or other fluid, acting on these slides or pistons, rotates the wheels or disks carrying the same. The required radial motion of the said slides or pistons is effected by pins secured thereto and working in elliptically-formed grooves in the two side walls of the chamber. These grooves both have a contour corresponding to the form of the elliptical chamber.

The accompanying drawings show the machine in various views.

Figure 1 is a vertical transverse section on the line V W, Fig. 2. Fig. 2 is a front view of the motor with the cover partly removed. Fig. 3 is a vertical section on the line O q, Fig. 2. Fig. 4 is a vertical section on the line Y X, Fig. 2, some of the parts being removed; and Fig. 5 is a section taken on the line $x'\ y'$, Fig. 1.

On the shaft O is mounted the slightly conical wheel or disk A, which is provided with a toothed rim $c$ and is mounted steam-tight in suitable bearings in the cylindrical casing A', which has a slightly conical seating for the wheel or disk A. The corrugations or teeth do not extend over the entire height or width of the periphery of this wheel or disk, Figs. 1 and 2. Therefore a steam-tight joint will be formed on each side of them by reason of the conical form of the wheel or disk A. The steam flows to the said wheel or disk on the right and left hand sides thereof through the two-way cocks $a\ a'$ in the casing and then through the passages $d$ in the direction of the arrow, Figs. 2 and 4, onto the toothed periphery of the wheel or disk A, so that a rotary motion is imparted to the said wheel or disk toward the right by reason of the velocity or dynamic force of the steam. The passages $d'$ serve for reversing the direction of rotation of the motor. For this purpose both of the two-way cocks $a\ a'$ are so turned that the passages $d'$ are opened and the passages $d$ closed. The steam can then turn the said wheel or disk toward the left. The teeth on the wheel or disk A are made of similar shape on both sides for this purpose.

On the rotation of the wheel or disk A through an angle corresponding to the breadth of one or more teeth one or other of the spaces $c$ between the teeth reaches a steam-outlet passage $b$ through which the steam in the spaces between the teeth passes into the elliptical chamber B', Figs. 2, 4, and 5, arranged at the side of the casing A'. The spaces A' and B' are separated by a partition C. On the shaft O is also mounted the wheel or disk B in the expansion-chamber B'.

At the right and left hand sides of the expansion-chamber B', Fig. 2, as well as at the extremities of the shorter or minor axis of the ellipse, the wheel or disk B works steam-tight against the inner surface of the chamber B'.

The wheel or disk B is provided with radially-arranged flat slides or sliding pistons S, of which five are shown in the drawings. These slides or pistons S are provided above and below with pins or projections $s$, which travel in grooves R in the partition C and cover D. The said grooves are so formed as to correspond to the elliptical shape of the expansion-chamber B', so that during the travel of the pins $s$ in the grooves R the slides or pistons will move in and out steam-tight along the inner surface of the elliptical chamber B'. The centrifugal force will assist this motion and insure the steam-tightness of the sliding joints between the slides or pistons S and the inner surface of the expansion-chamber B'. As soon as the steam passes into the expansion-chamber B' through the passage $b$ it presses against the slides or pistons S and expands, thus assisting to rotate the wheel or disk B toward the right, Fig. 2, or toward the left, as in Fig. 5, the radial distance between the outer periphery of the circular expansion wheel or disk B and the inner surface of the elliptical chamber B', which at the admission of the steam is nearly nothing, continually increasing until it reaches a maximum at or near the line V W, when it again decreases as it approaches the line Y X, and so on. In this manner a second transfer of power takes place from the steam to the shaft O. The steam which has been expanded and usefully employed between two slides or pistons S escapes through the outlet or exhaust cock or valve $q$.

As above mentioned, the steam also acts on the periphery of the toothed wheel or disk A at the other side of the casing A', Fig. 2, through the passage $a'$, and then passes through the passage $b$ into the chamber B' to expand against the slides or pistons S on the opposite side of the line Y X, after which it escapes by the outlet-cock $q'$ at the other side of the motor. The steam from the boiler thus acts directly at two diametrically opposite points on the periphery of the toothed wheel A and expands against the slides or pistons S of the wheel or disk B at the upper and lower sides of the motor, so that the motor is perfectly balanced and a smooth motion is insured.

By employing several expansion wheels or disks B with their elliptical chambers B' on a single shaft multiple expansion of the steam can be effected and the motor thereby made a compound, triple, or quadruple expansion engine.

The reversal of the direction of motion of the engine is effected by simply turning the inlet-cocks $a$ $a'$, whereby the steam, as above mentioned, flows through the passages $d'$ and in the direction of the dotted arrows through the passages $b'$ into the expansion-chamber B', while the outlet or exhaust cocks or valves $q$ $q'$ are closed and the exhaust cocks or valves $q^2$ $q^3$ opened.

If it is desired that the motor shall be capable of turning in only one direction, the cocks $a$ $a'$ can be one-way cocks, and the passages $d'$ $b'$ and the outlet or exhaust cocks $q^2$ $q^3$, or the like, can be dispensed with, and the motor thereby much simplified.

What I claim is—

1. In a rotary engine, the combination of a cylindrical casing having two double sets of admission and exhaust ports located on diametrically opposite sides thereof, a reversing valve or cock governing the admission-ports of each set, a rotary shaft extending through said casing, a toothed wheel or disk mounted on said shaft within the casing, an elliptical chamber in communication with said exhaust-ports and provided with other exhaust-ports located diametrically opposite each other, a wheel or disk mounted on said shaft within the elliptical casing, radial slides or sliding pistons carried by said wheel or disk, each of said slides or pistons being diametrically opposite the center of the space between two others of such slides or pistons, substantially as and for the purposes specified.

2. In a rotary engine, the combination with an elliptical chamber provided with admission-ports and exhaust-ports diametrically opposite each other, respectively, a rotary shaft extending through said chamber, a wheel or disk mounted on said shaft within the chamber, radial slides or pistons carried by said wheel or disk, each slide or piston being located diametrically opposite the center of the space between two other slides or pistons, and a slightly conical wheel or disk formed with teeth or projections on its periphery and with continuous peripheral walls on both sides of said teeth or projections, and a casing provided with admission and exhaust apertures and having a conical seating in which said conical wheel or disk works, substantially as and for the purposes hereinbefore described.

3. In a rotary engine, the combination of a casing A', a shaft O working in bearings therein, a slightly conical wheel or disk A having a toothed periphery and mounted on said shaft within the casing, admission-ports $d$, $d'$, reversing valves or cocks $a$, $a'$ governing said admission-ports, whereby the fluid may be directed against the toothed periphery of said wheel or disk in either direction, an elliptical chamber B' provided with exhaust-ports $q$, $q'$, $q^2$, $q^3$, passages $b$, $b'$ communicating between said elliptical chamber and the casing A, a wheel or disk B mounted on said shaft within the elliptical chamber, and radially-sliding pistons S fitted in said wheel or disk B, each slide or piston being located diametrically opposite the center of the space between two other slides or pistons, substantially as and for the purposes above specified.

ANDRIES FREDERIK SINCLAR VAN DE LAAR.

Witnesses:
MERTONE DOYER,
AUGUST SIEGFRIED DOER.